United States Patent

Castrillon

[15] 3,671,455

[45] June 20, 1972

[54] NITRILES AS SCINTILLATION SOLVENTS AND SOLUTES

[72] Inventor: Jose P. A. Castrillon, Rio Piedras, P.R.

[73] Assignee: The United States of America as represented by the United States Atomic Energy Commission

[22] Filed: May 6, 1971

[21] Appl. No.: 140,926

[52] U.S. Cl. ..................................................252/301.2 SC
[51] Int. Cl. ...........................................................C09h 1/02
[58] Field of Search ..........................252/301.2 SC, 301.2 R

[56] References Cited

UNITED STATES PATENTS

3,068,178  12/1962  Kallmann et al. .............252/301.2 SC
3,360,478  12/1967  Schimitschek..................252/301.2 R Primary Examiner—Robert D. Edmonds
Attorney—Roland A. Anderson

[57] ABSTRACT

Benzonitrile is shown to be an efficient scintillation solvent. Although somewhat inferior to toluene, it can surpass the performance of this standard solvent if quenchers are present. Furthermore, its high dielectric constant, dipole moment and complexing ability make it suitable for the counting of polar and metallic compounds. It has the interesting property of showing an appreciable light yield in the pure state, thus allowing the counting of $\alpha$-emitters with no fluors added. Acetonitrile, on the other hand, is a very poor scintillation solvent, although it improves considerably on addition of naphthalene. Also, in a 40 percent mixture with benzonitrile, the efficiency is good enough for most purposes. It has been determined that other aromatic nitriles are also efficient scintillation solvents: p-tolunitrile, 2,3- and 2,4-dimethylbenzonitrile and phenylacetonitrile, for example. Certain aromatic nitriles are shown to be fairly satisfactory scintillation solutes.

9 Claims, 8 Drawing Figures

INVENTOR.
Jose P.A. Castrillon

INVENTOR.
Jose P.A. Castrillon
BY
ATTORNEY.

NITRILES AS SCINTILLATION SOLVENTS AND SOLUTES

BACKGROUND OF THE INVENTION

This invention was made in the course of, or under, a contract with the United States Atomic Energy Commission.

Since the early basic work of Kallman and First (1951) and Hayes and collaborators (1955) practically no new primary solvents have been introduced in the field of liquid scintillation counting. Among the exceptions, isopropylbiphenyl, methyl and ethyl anthranilate, 1-methyl-naphthalene, 2-ethyl-naphthalene, 1,2- and 1,6-dimethylnaphthalene should be mentioned. None of these, however, is in general use.

Basically, for today's operator, the choice of solvent is limited to two classes of compounds: aromatic hydrocarbons and ethers. The first one has the drawback of low solubilizing power for many types of samples; in particular, polar ones; the second, counterbalancing its lower efficiency with the possibility it affords of counting aqueous samples, suffers the disadvantages of a general tendency to peroxide formation that can lead to unwanted reactions, particularly, chemiluminescent ones.

There is a vast number of substances that could be called secondary solvents which include solvents from low scintillating efficiency to even quenchers, included in order to reduce the cost of the mixture or increase the solubility of the sample, additives such as naphthalene that improve the efficiency of a poor solvent, and substances incorporated with the specific object of trapping $CO_2$, dissolving tissue, etc. However, they are all based on a primary solvent belonging to one of the two families mentioned above.

The present invention involves a third class of primary solvents, that of nitriles, and they have certain advantages over the above-mentioned first two classes of solvents which will be discussed hereinbelow. In addition, the present invention involves the use of certain aromatic nitriles as a new family of scintillation solutes.

SUMMARY OF THE INVENTION

It is the primary object of the present invention to provide for a new class of primary solvents for use in liquid scintillators for scintillation counting.

It is another object of the present invention to provide for a new class of solutes for use in liquid scintillators.

The above primary object has been accomplished in the present invention by utilizing benzonitrile as the primary solvent in liquid scintillators, by utilizing acetonitrile (with naphthalene) as the primary solvent, or by utilizing various mixtures of benzonitrile and acetonitrile as the primary solvent. It has been determined that other aromatic nitriles are also efficient scintillation solvents: p-tolunitrile, 2,3- and 2,4-dimethylbenonitrile and phenylacetonitrile, for example. (P-tolunitrile is a low melting solid (29.5° C) but its melting point can be considerably lowered by the addition of small quantities of other scintillation solvents). The use of benzonitrile, if quenchers are present, can surpass the performance of the standard solvent, toluene.

The above second object of the present invention has been accomplished by utilizing certain aromatic nitriles as scintillation solutes in the manner to be described hereinbelow.

BRIEF DESCRIPTION OF THE DRAWINGS

FIG. 4 is a graph illustrating the effects of quenching with different amounts of $CCl_4$ on the logarithm of the ratio of the quenched count rate the unquenched rate for various solvents.

DESCRIPTION OF THE PREFERRED EMBODIMENTS

It has been discovered that benzonitrile constitutes an excellent scintillation solvent and that when quenchers are present it can surpass the performance of the standard solvent toluene. The apparatus used for testing the benzonitrile solvent to determine its usefulness as a scintillation solvent, as well as other tests on other solvents and combination of solvents, was a Beckman liquid scintillation spectrometer, Model LS-II, without refrigeration, Tritium and $^{14}C$ were counted by means of the corresponding plug-in modules. All samples were prepared and counted under air.

All solvents as well as the carbon tetrachloride used in the quenching test were spectro grade. Benzonitrile was further purified by fractional distillation under reduced pressure. It showed to be at least 99.99 percent pure by gas chromatography. The solutes used were all scintillation grade commercial products. The reagent grade benzophenone was recrystallized twice. It showed no contaminants on thin layer chromatography.

Three stock solutions in toluene, benzonitrile and acetonitrile were prepared by adding 50.0 mg of $^{14}C$ labeled phenylacetic acid to 500 ml of each solvent. Fifteen ml aliquots were measured out to the counting vials with a calibrated pipette and then the desired amounts of scintillator, naphthalene or quencher were added.

The efficiencies for tritium counting were also determined by incorporating 1 mg of tritium labeled phenylacetic acid (weighed in a Cahn Electrobalance to the nearest 1/100 mg) was added to 15 ml of each solution.

Both the tritium and $^{14}C$ samples contained about 80,000 d.p.m., thus ensuring good counting statistics. Quenching due to the phenylacetic acid added was assumed to be negligible.

Figure 1:
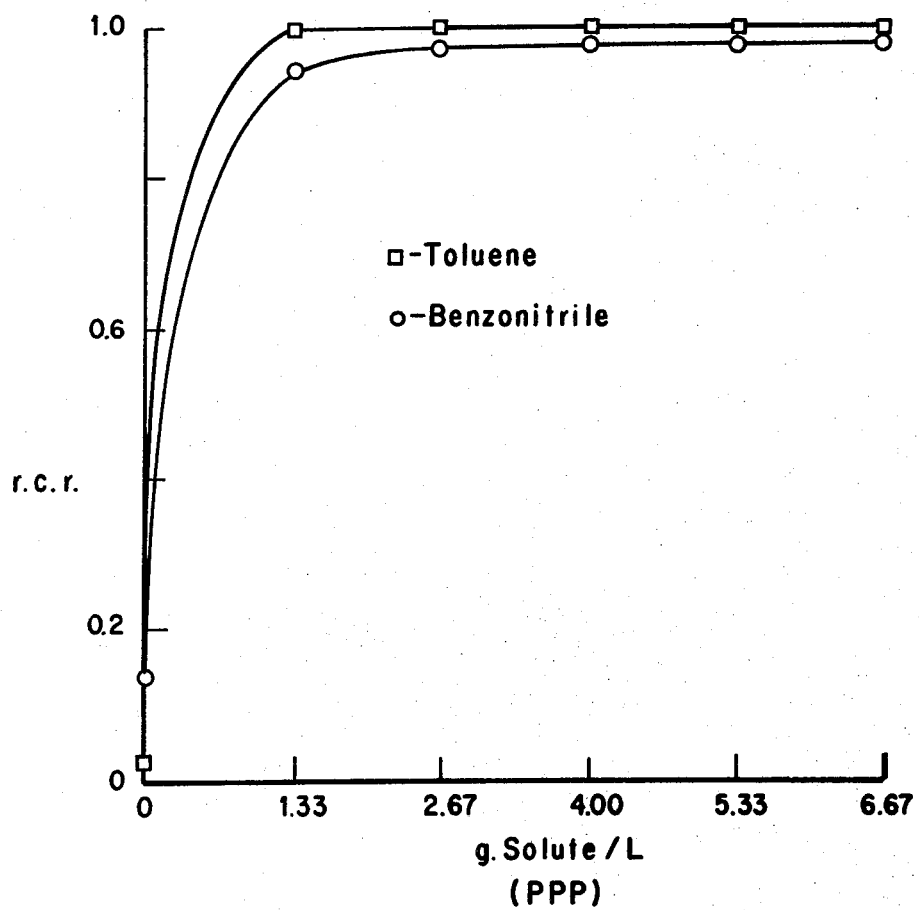
FIG. 1 is a graph illustrating a comparison of the relative counting rates of toluene and benzonitrile on addition of solute.

Benzonitrile's efficiency for $^{14}C$ grows on addition of solute in the same manner as it does for the classical solvent toluene, see FIG. 1, but to a slightly lower plateau (relative counting rate, taking that in toluene as unity, 0.98). The difference for the two solutes, PPO and PPP (p-terphenyl) are very slight and do not show in the scale of the plot. A remarkable feature of benzonitrile is that it behaves as a scintillator even when pure. The relative counting rate for $^{14}C$ in pure benzonitrile is 0.14.

Figure 2:
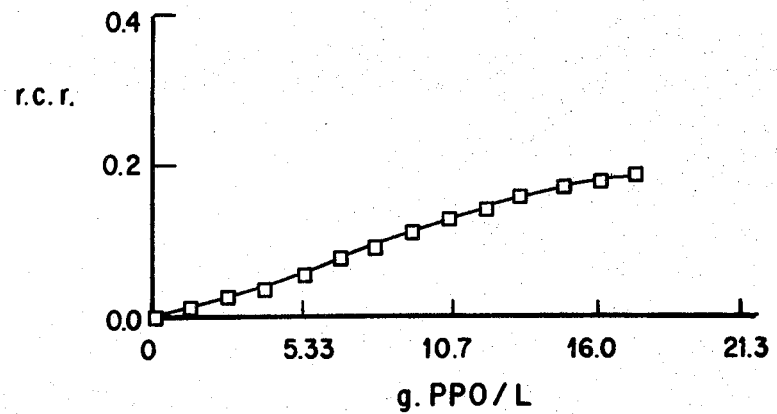
FIG. 2 is a graph illustrating the relative counting rate of acetonitrile with various additions of PPO (2,5-diphenyloxazole).
Figure 3:
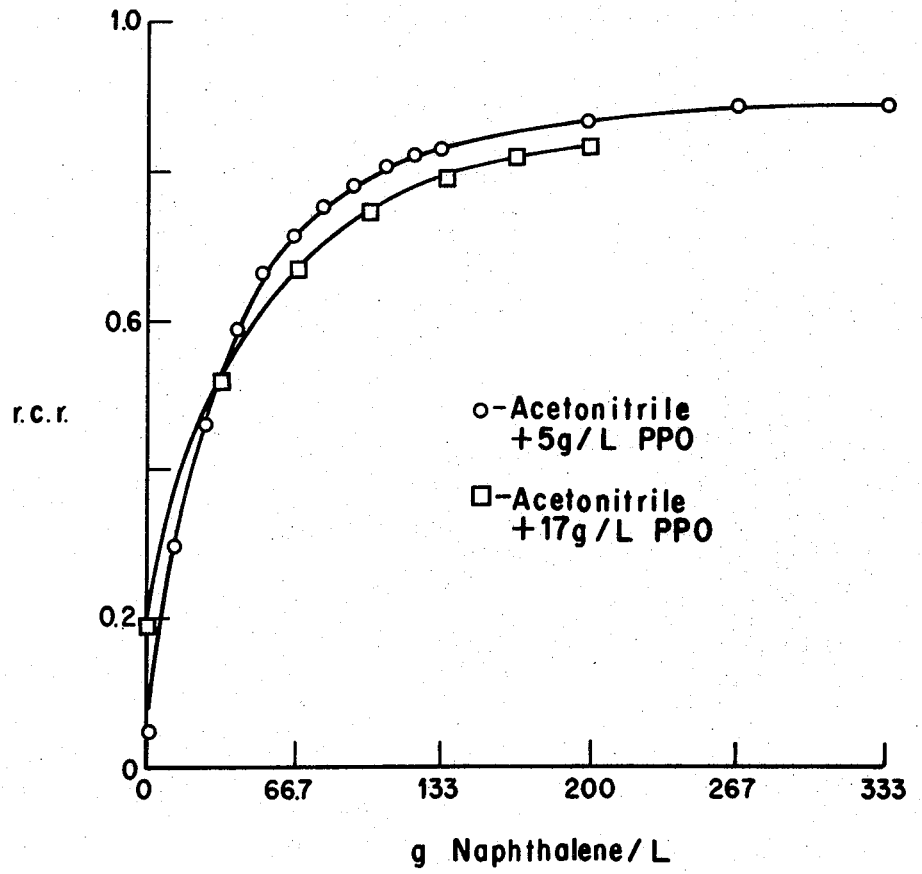
FIG. 3 is a graph illustrating the relative counting rates of acetonitrile when mixed with various amounts of naphthalene and different amounts of PPO.

Acetonitrile, as expected, since it is not an aromatic compound, proves to be an efficient scintillation solvent; its efficiency growing more or less linearly on addition of PPO, see FIG. 2, but even for a large amount of PPO (1.7%, 17 grams per liter), the relative counting rate does not surpass 0.19. Since the efficiency of poor solvents usually increases considerably on addition of naphthalene, the same expedient was tried on acetonitrile containing 1.7% PPO, with the results shown in FIG. 3. The relative counting rate does, indeed, increase, and does not yet level off at about 200 grams naphthalene per liter and a relative count rate of 0.83. Addition of naphthalene to a less concentrated solution, containing only 0.5% (5 grams/liter), shows in FIG. 3 that in this case the same efficiency can be reached with much less naphthalene.

Figure 4:
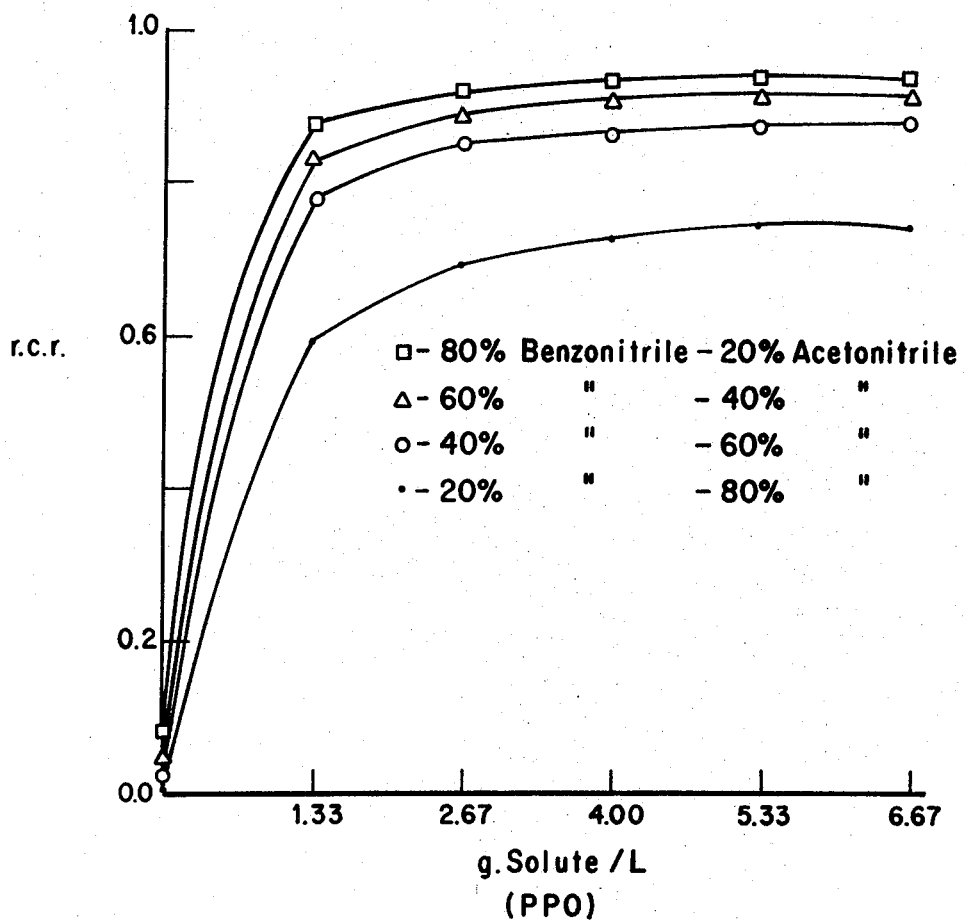
FIG. 4 is a graph illustrating the relative counting rates of various mixtures of benzonitrile and acetonitrile with addition of various amounts of PPO.

Plots that represent the influence of addition of PPO on mixtures of benzonitrile-acetonitrile are shown in FIG. 4. As expected, the efficiency decreases with increasing content of acetonitrile. The region of 40–60 percent content of acetonitrile seems to afford a good compromise for the counting of aqueous samples.

The relative counting rates for tritium in different solvents, all containing the same concentration of PPO (0.5 percent) and POPOP (0.05 percent), are listed in Table I. POPOP may be identified as: [1,4-bis-2-(5-phenyl-oxazolyl)-benzene].

TABLE I

| Solvent | Relative Counting Rate |
| --- | --- |
| Toluene | 1.00 |
| Dioxane + 5% Naphthalene | 0.77 |
| Benzonitrile | 0.76 |
| Benzonitrile (a) | 0.74 |
| 60% Benzonitrile + 40% Acetonitrile | 0.52 |
| Acetonitrile + 5% Naphthalene | 0.042 |

(a) PPP as solute, instead of PPO.

Here, what was not obvious for $^{14}C$ measurements, is clearly shown, that is, that the light yield in benzonitrile is lower than in toluene. Still, it is comparable to that of the widely used mixture: dioxane-naphthalene. The mixture 60 percent benzonitrile-40 percent acetonitrile, still provides a reasonable efficiency, while the performance of acetonitrile-naphthalene is very poor.

The effect of two strong quenchers, benzophenone and carbon tetrachloride, was studied for $^{14}C$ counting in toluene, benzonitrile and acetonitrile-naphthalene scintillation solutions. The solutions contained 5 grams PPO per liter of solvent, with the addition of 200 grams naphthalene in the case of acetonitrile.

Figure 6:
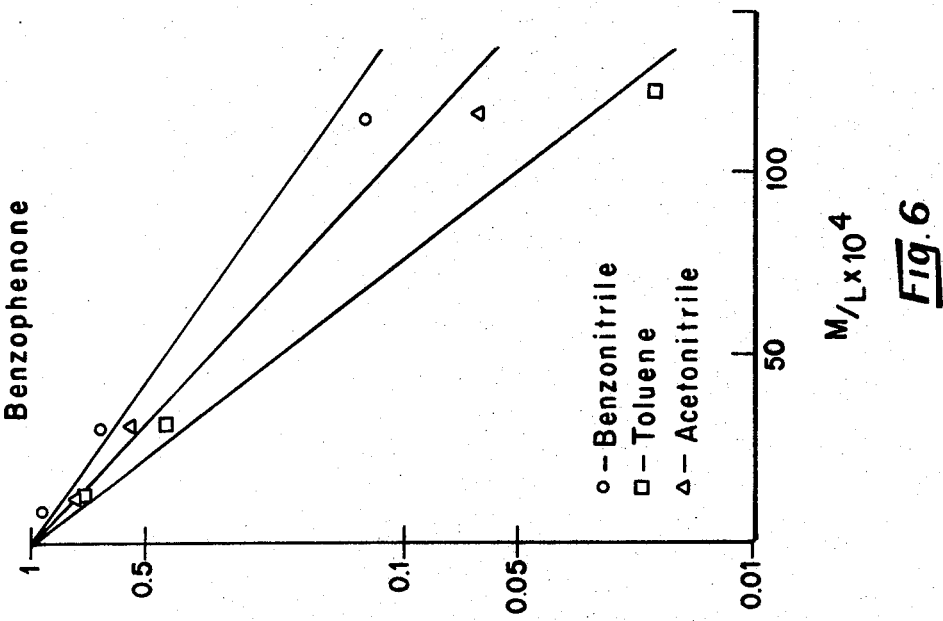
FIG. 6 is a graph illustrating the effects of quenching with benzophenone on the logarithm of the ratio of the quenched count rate over the unquenched rate for the same solvents used in FIG. 5.
Figure 5:
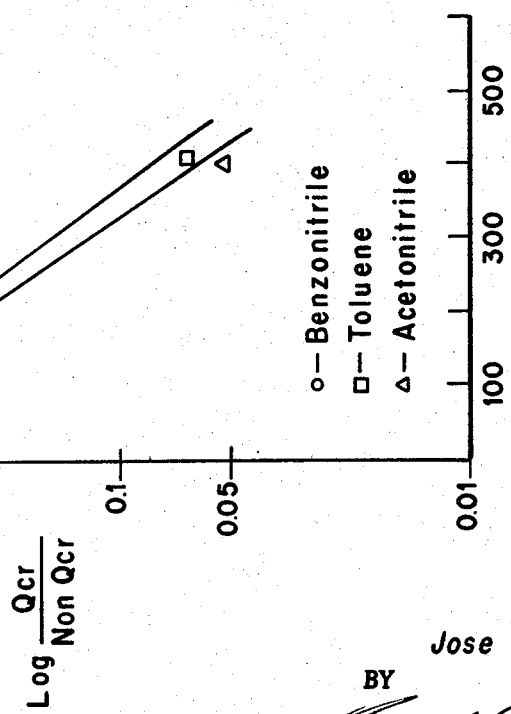

The counting window was established by raising the lower discriminator until the counting rate of the unquenched sample was reduced to half. The logarithm of the ratio of the quenched count rate over the unquenched rate was then plotted versus the molar concentration of the quencher. Although the experimental points do not strictly fall on straight lines, these can be approximately drawn to visualize the different degrees of quenching. From FIGS. 5 and 6, it can be seen that benzonitrile is much less sensitive to the effect of both quenchers. Since benzonitrile is almost as efficient as toluene, these results show that in the presence of a quencher, benzonitrile can show an efficiency considerably higher than that of toluene. For example, at a concentration of $CCl_4$ of $433 \times 10^{-4}$ m/l, for the same activity of $^{14}C$, the counting rate in benzonitrile is 5.7 times that in toluene; at a concentration of benzophenone of $117 \times 10^{-4}$ m/l, 6.1 times. The lesser sensitivity to quenching of benzonitrile compared to toluene, can be due, at least in part, to its higher viscosity.

Although the solubility of water in benzonitrile is much higher than in toluene, it is still very small. The benzonitrile scintillation solution used in this test dissolves approximately 0.5 percent water without any noticeable efficiency loss of $^{14}C$, or even tritium counting. Larger amounts of water, up to 1 percent and more, can be counted in benzonitrile for water disperses very easily on vigorous shaking giving stable suspensions.

In the scintillation solution obtained from 60% benzonitrile-40 percent acetonitrile, the solubility of water is approximately 3.3 percent. Excess water disperses more readily then in pure benzonitrile, but the suspension is less stable.

Since peroxides are not formed in nitriles by standing, one could expect the absence of the chemiluminescent reactions, due to peroxides, which are so frequent when ethers are used as solvents. Nevertheless, if strong oxidizing agents are contained in the sample, chemiluminescent reactions may occur. The addition to 10 ml samples of benzonitrile of 1 mg m-chloroperbenzoic acid or iodoso benzene diacetate gave counting rates in the order of 10,000 per minute, presumably due to nitrile oxide formation.

Since benzonitrile is a scintillator "per se," albeit a not very efficient one, it allows the counting of energetic particles without the addition of a fluor. This property plus a good solubilizing ability for heavy metal ions, via complex formation, makes it particularly convenient for $\alpha$ counting.

Figure 7:
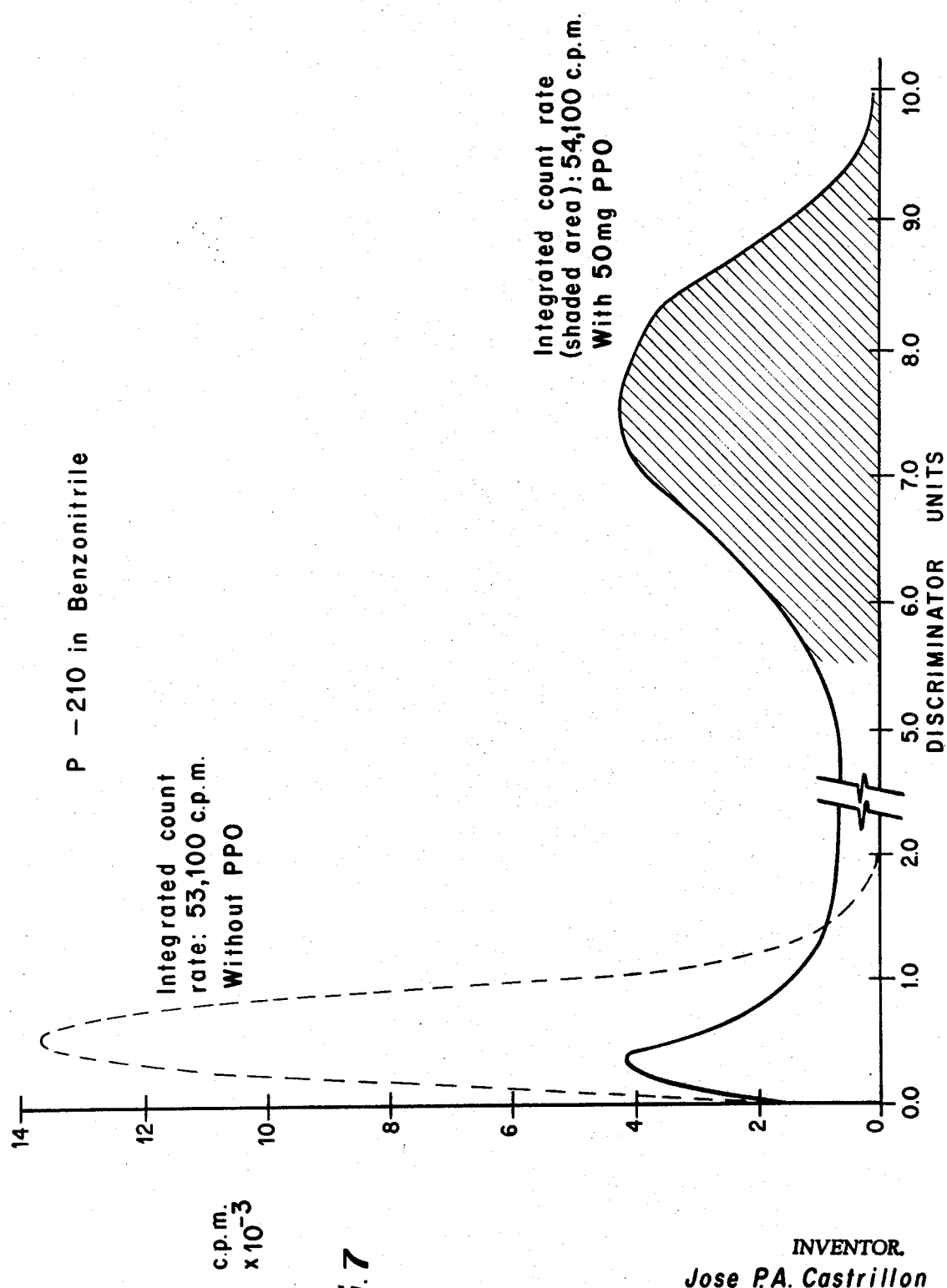
FIG. 7 is a graph illustrating the relative count rates of $210_{po}$ dissolved in benzonitrile in terms of discriminator units before and after addition of PPO.

$^{210}Po$ emits $\alpha$ particles of 5.3 MeV and no $\beta$'s, decaying into stable $^{206}Pb$. Therefore, except for a very slight proportion of $\gamma$'s, it serves as a pure $\alpha$ source. A trace amount in the form of polonium nitrate was dissolved in 10 ml benzonitrile, counted and the spectrum ran in terms of discriminator units, taking successive 2 percent windows, before and after addition of 50 mg PPO, see FIG. 7. In the presence of PPO, the $\alpha$ peak is strongly displaced to the high energy end, but the integrated count rate remains the same, suggesting that the $\alpha$ particles are counted with near 100 percent efficiency in pure benzonitrile. A second peak in the low energy end appears, and it is probably due to contamination with an emitter of weak $\beta$ or X rays.

Entirely analogous results are obtained with $^{241}Am$, except that in this case the low energy peak that the addition of PPO reveals, can be attributed to the conversion electrons and X rays also present in the radiation of this isotope.

Figure 8:
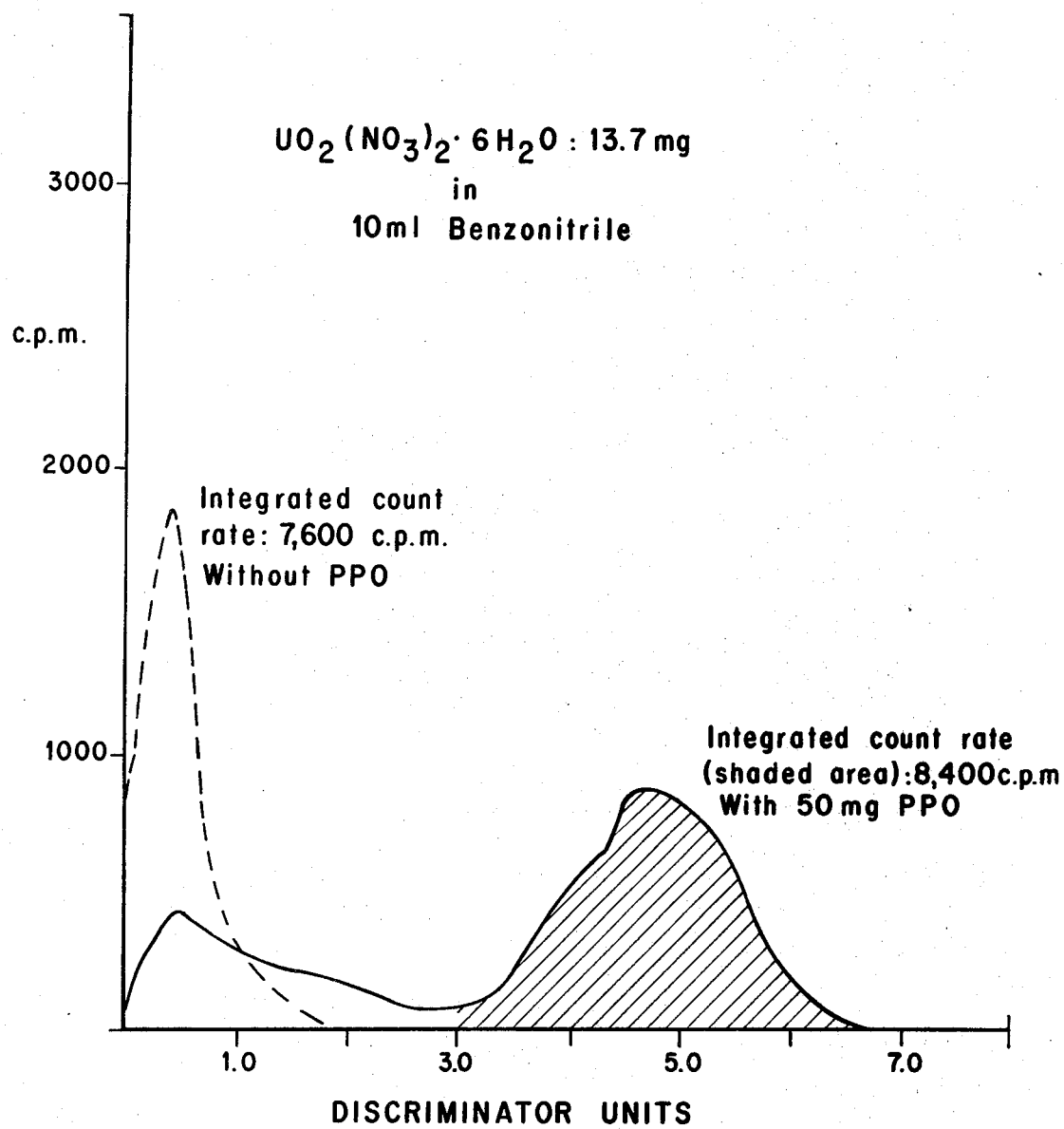
FIG. 8 is a graph illustrating the relative counting rates of uranyl nitrate dissolved in benzonitrile in terms of discriminator units before and after addition of PPO.

The results obtained with uranyl nitrate dissolved in benzonitrile are shown in FIG. 8. It should be remembered that it is a complex emitter including members of the chain between $^{238}U$ and $^{234}U$, and that energetic $\beta$'s may be superimposed with the $\alpha$ portion of the spectrum. In the low energy peak, weak betas plus internal conversion of electrons may be superimposed. The efficiency is not very high, but the fact the solution is markedly yellow must be kept in mind.

The good and other features of benzonitrile as a scintillation solvent in comparison with toluene and dioxane will now be summarized. Benzonitrile's efficiency is lower than that of toluene, and higher than for pure dioxane. It is, in fact, comparable to the widely used combination dioxane-naphthalene; this means that, except for the most weak $\beta$ emitters, no significant reduction in the counting rate will be observed if used instead of toluene. Furthermore, in the case of quenched samples it may be more efficient than toluene.

Benzonitrile is, of course, highly toxic, but this should not be a serious disadvantage, since adequate precautions (well ventilated hoods, avoidance of skin contact, etc.) can be easily taken.

Although the melting point, $-13°$ C, is much higher than in the case of toluene, it still leaves ample room for refrigerated counting and is considerably lower than that of dioxane.

The occurrence of chemiluminescent phenomena, in the presence of oxidants, is a disadvantage with regard to toluene which is shared by ethers. In fact, since after standing in air, ethers and dioxane, in particular, will contain peroxides, this nuisance can be expected to be more frequent in ether based solvents than in benzonitrile.

Although pure benzonitrile is higher in cost than other solvents, it may nevertheless be the solvent of choice. It has a high dipole moment (4.02 in benzene at 20° C), and a high dielectric constant (26.3; for acetonitrile it is even higher; 36.4) which makes it an excellent solvent, particularly for metallic salts. To mention only a few examples, silver salts are, in general, soluble in benzonitrile; silver nitrate, in particular, dissolving at the rate of 105 grams per 100 grams of benzonitrile; and many other salts of different cations are also soluble in benzonitrile: $(CH_3COO)_2 Zn$, $FeCl_3$, $LiCl_2$, $HgCl_2$, $SbCl_3$, and $CuCl_2$, for example. In general, acetonitrile is a better solvent and, therefore, the benzonitrile-acetonitrile mixtures and even the acetonitrile-naphthalene system, would be convenient in some liquid scintillators.

Concerning the possibility of Cherenkoff counting of energetic betas in benzonitrile, since its refractive index is 1.5289 at 20° C, the threshold for $\beta$ detection would be 165 KeV. This means that for $\beta$'s exceeding this energy, Cherenkoff photon will add to the fluorescence photons, facilitating counting in pure benzonitrile.

It should be understood that the present invention is not limited to the nitriles discussed above. It has been determined that other aromatic nitriles, as listed in the "Summary of the Invention" above are also efficient scintillation solvents.

From the above discussions, it can be seen that benzonitrile is an efficient scintillation solvent, and that it has the unusual property of behaving as a moderate scintillator even when pure. This would seem to indicate the possibility that aromatic nitriles of suitable structures could function as scintillation solutes. The fluorescence of aromatic nitriles is well known and since the introduction of a cyano substitutent, in general, enhances fluorescence, it can be expected that some of these compounds, in particular, those derived from known scintillators will be useful as either primary or secondary solutes.

The scintillation spectrum of $^{109}$Cd, dissolved in the form of 2-ethylhexanoate, in deaerated toluene solution has been determined by means of a Beckman liquid scintillation spectrometer, Model LS-II, using a series of aromatic nitriles as scintillation solutes. At the same concentrations used later to determine tritium efficiencies, four members of the series: 4,4'-dicyanobiphenyl, 9,10-dicyanoanthracene, 4-cyanoterphenyl, and 4,4'-dicyanoterphenyl showed the peak corresponding to the 84 KeV conversion electrons of $^{109}$Cd at the same or higher position in the discriminator as done by the solute PPP. However, a certain degree of smearing in the spectra was evident.

The efficiency of these compounds in aerated toluene solution for tritium counting relative to PPP was also determined. This provides a stringent test of more practical value; the results are shown in the following Table II:

TABLE II

| Substance | Color | Concentration (Mol/l) | Efficiency |
|---|---|---|---|
| P-terphenyl (PPP) | colorless | 0.0200 | 1.00 |
| 2,5-Diphenyloxazole (PPO) | colorless | 0.0200 | 1.01 |
| 9,10-Dicyanoanthracene (CAC) | yellow | 0.0029 | 0.49 |
| 4,4'-Dicyanobiphenyl (CBC) | colorless | 0.0200 | 0.83 |
| 4-Cyanoterphenyl (CTP) | colorless | 0.0078 | 0.89 |
| 4,4'-Dicyanoterphenyl (CTPC) | colorless | 0.0012 | 0.57 |

Compounds CAC, CTP and CTPC were tested at lower concentrations because of poor solubility. Although none of the nitriles tested surpasses the standard solutes, PPO and PPP, they show fairly high efficiencies and could be used for tritium counting. The result obtained with the very low concentration CTPC is particularly striking. For $^{14}$C with $\beta$'s of considerably higher energy, the efficiencies of CBC, CTP and CTPC are practically the same as for PPO and PPP, the comparison being made at the concentrations already indicated.

This invention has been described by way of illustration rather than limitation and it should be apparent that it is equally applicable in fields other than those described.

What is claimed is:

1. An improved liquid scintillator mixture consisting essentially of a solvent selected from the group consisting of benzonitrile, acetonitrile, p-tolunitrile, 2,3-dimethylbenzonitrile, 2,4-dimethylbenzonitrile, and phenylacetonitrile, and a primary solute selected from the group consisting of p-terphenyl and 2,5-diphenyloxazole of a selected amount in the range from 1 gram to 7 grams per liter of solvent.

2. The scintillator set forth in claim 1, wherein said selected solvent is benzonitrile, and said selected solute is 2,5-diphenyloxazole.

3. The scintillator set forth in claim 1, wherein said selected solvent is benzonitrile, and said selected solute is p-terphenyl.

4. The scintillator set forth in claim 1, wherein said solvent consists of a mixture of benzonitrile and acetonitrile with the content of said acetonitrile in said mixture being of a selected amount in the range from 40–60 percent and said selected solute is 2,5-diphenyloxazole.

5. The scintillator set forth in claim 1, wherein said selected solvent is acetonitrile, said mixture further including naphthalene of a selected amount in the range from 60 grams to 200 grams per liter.

6. The scintillator set forth in claim 1, wherein said selected solvent is p-tolunitrile.

7. The scintillator set forth in claim 1, wherein said selected solvent is 2,3-dimethylbenzonitrile.

8. The scintillator set forth in claim 1, wherein said selected solvent is 2,4-dimethylbenzonitrile.

9. The scintillator set forth in claim 1, wherein said selected solvent is phenylacetonitrile.

* * * * *